April 26, 1966 R. S. CARTER ETAL 3,248,698

COMPUTER WRAP ERROR CIRCUIT

Filed Dec. 23, 1963 4 Sheets-Sheet 1

INVENTORS
RICHARD S. CARTER
RALPH D. ROSS
WALTER W. WELZ

BY Melvin R. Williams
ATTORNEY

ADDRESS MODIFIER THOUSANDS

IAR MODIFIER SET

United States Patent Office 3,248,698
Patented Apr. 26, 1966

3,248,698
COMPUTER WRAP ERROR CIRCUIT

Richard S. Carter, Walter W. Welz, and Ralph D. Ross, Poughkeepsie, N.Y., assignors to International Business Machines Corporation, New York, N.Y., a corporation of New York Filed Dec. 23, 1963, Ser. No. 332,782
5 Claims. (Cl. 340—146.1)

This invention relates to data processing, and more particularly to a circuit for monitoring wrap-around of memory addresses and conditionally generating an error signal in response thereto.

In the data processing art, a type of computer within which any memory location may be specifically addressed, and the locations chained into words of varying lengths, has been known as a variable word length computer. In this type of computer, only the address of the storage location containing a first character of a word is originally specified; as processing proceeds, address modification means continually increment the memory addresses so as to specify additional locations necessary in order to retrieve all of the characters of a variable length word. This form of addressing is, of course, relatively independent of the program since the addressing is done automatically by the machine as processing proceeds. It is therefore possible in certain cases for the highest address of the memory to be incremented thereby causing an "Address Wrap-Around Condition." When, for instance, an address such as 99999 is the address of the last storage location in memory, incrementing of this address by one will result in an address of 00000 since the addressing means cannot specify any more than five digits, and the carry (a one) is lost. Thus, incrementing the highest address will result in specifying the lowest address in the memory: this is the condition referred to above as "Address Wrap-Around."

An address wrap-around of the type just described is defined herein as a FORWARD WRAP CONDITION. A similar condition, defined herein as a REVERSE WRAP CONDITION, exists when the address 00000 is decremented by one unit, resulting in an address of 99999.

In certain variable word length machines, an instruction read-out may be of variable length, and the end of the current instruction (the one being read out of memory) is indicated by sensing a WORD MARK bit or other indication in the first character of the next subsequent instruction. Thus, addressing has to proceed one step further than necessary in order to terminate the current instruction read-out operation. It is possible in such a machine to place a word mark or other indication in address 00000, which address is not normally used for general storage purposes, thereby permitting use of the address 99999 as a last character address of an instruction. In such a case, however, circuits of the prior art type which are used to sense address wrap-around conditions would cause the machine to go into an error stop condition, even though the address 00000 was used only to indicate the end of the previous instruction, and not as a valid address for the next instruction. Alternatively, the address location 99999 could include just a WORD MARK bit terminating an instruction read-out, thereby avoiding address wrap around. Other examples of potential wrap around errors which need not cause error stop conditions may be found in the art.

In variable word length, flexible address, multiprocessing computers, address wrap around poses even greater problems. A computer of this type is disclosed in a commonly owned copending application of Richard S. Carter and Walter W. Welz, entitled, Parallel Memory, Multiple Processing, Variable Word Length Computer, Serial No. (IBM Docket 7705) filed on even date herewith. Therein, a preferred embodiment will process either one or two characters within each processed cycle. Since it is not known at the start of the processing cycle whether both characters will be useful and therefore processed, the address of one of the characters is generally incremented by one unit, and the address of the second character is incremented by two units; during a second character processing time, the first of these will be re-incremented if both characters are processed, and the second of these will be decremented if only one character is processed, alternatively. Thus, an initial modification of an address by two units may not be used due to the fact that the address is remodified by only one unit prior to the end of the processing cycle. In such a case, the address wrap error circuits known to the prior art would cause an error stop to occur if the address 99998 were incremented by two, so that the machine would stop even though the address might have otherwise been remodified so as to specify address 99999 rather than address 00000.

Therefore, it is a primary object of this invention to provide an improved, more refined address wrap-around monitoring circuit.

Another object is to provide a circuit for sensing address wrap around conditions and for selectively using a wrap around indication as an error only in certain cases.

A further object is to provide an address wrap around error circuit which responds to wrap around conditions to generate an error signal only when the conditions actually represent errors.

This invention is predicated on the concept that a wrap around condition should not be recognized as an error unless the address generated as the result of the wrap around is actually scheduled for use in accessing the memory.

In accordance with the present invention, a latch is set whenever wrap around occurs, and the latch is reset whenever wrap around is removed; the output of the latch is not sensed except at the end of a processing cycle. Therefore, if the wrap around condition is removed prior to setting an address register, the original wrap around condition is never set into the latch; on the other hand, if the condition is still present when the address register is to be set, a Wrap latch will be set; the latch is tested only after all modifications have been made and the latch has possibly been reset.

This invention obviates the necessity for eliminating the use of the highest ordered locations and/or the lowest ordered locations in a memory, and permits the use of provisional address modification without unwarranted wrap around error stops resulting therefrom.

The foregoing and other objects, features and advantages of the invention will be apparent from the following more particular description of a preferred embodiment thereof, as illustrated in the accompanying drawings.

Figure 1:
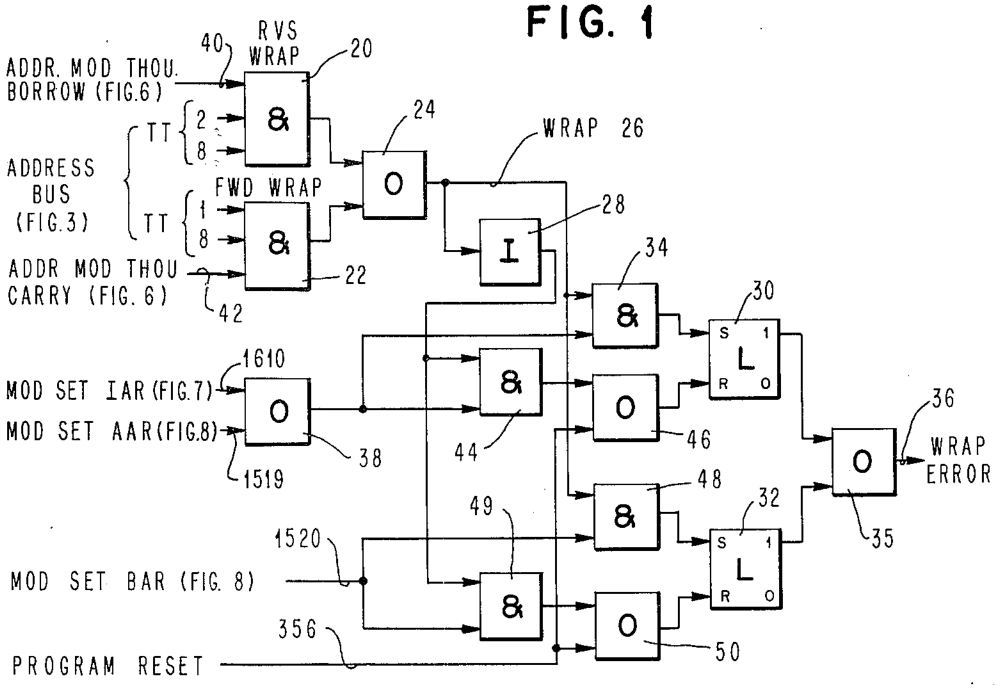
FIGURE 1 is a schematic book diagram of a WRAP ERROR circuit in accordance with an illustrative embodiment of the present invention.

In FIGURE 1, a WRAP ERROR signal is generated on a line 36 by an OR circuit 35 in response to either one of two latches 30, 32. The latch 30 is set by an AND circuit 34 whenever there is a WRAP signal on the line 26 and a signal from an OR circuit 38 concurrently. The OR circuit 38 responds to a MOD SET IAR signal on line 1610 or to a MOD SET AAR signal on a line 1519. The output from the OR circuit 36 is therefore present when an address is being set into either the IAR (instruction address register 1312, FIGURE 5) or the AAR (A address register 1314, FIGURE 5). The WRAP signal on line 26 is generated by an OR circuit 24 in response to a REVERSE WRAP AND circuit 20 or a FORWARD WRAP AND circuit 22. The REVERSE WRAP AND circuit 20 operates when there is a decimal zero in a ten thousands position of the ADDRESS BUS 1300 at a time when there is an ADDRESS MOD THOUSANDS BORROW signal on a line 40. The FORWARD WRAP AND circuit 22 is operative when there is a decimal nine in the ten thousands order of the ADDRESS BUS concurrently with an ADDRESS MOD THOUSANDS CARRY signal on a line 42. Thus, the AND circuit 20 will generate the WRAP signal on line 26 whenever there has been a borrow from a zero, thereby causing a wrap around from a low address to high address (REVERSE WRAP), and the AND circuit 22 will generate the WRAP signal on line 26 whenever there is a carry from a nine causing the address to wrap around from high address to low address (FORWARD WRAP).

The WRAP signal on line 26 is inverted (28) and passed to AND circuit 44 which will be operative during the setting of either register as indicated by the OR circuit 38 whenever the AND circuit 34 is not operative. The AND circuit 44 causes an OR circuit 46 to reset the latch 30. The OR circuit 46 may also be operated by a PROGRAM RESET signal on a line 356. The latch 32 operates in the same fashion as the latch 30 except that the related AND circuit 48, 49 and OR circuit 50 are responsive to a MOD SET BAR signal on a line 1520 which will be energized whenever address information is actually being set into the BAR (B Address Register 1316, FIGURE 5).

In operation, the circuit of FIGURE 1 will recognize a WRAP condition by the AND circuits 20, 22, and if the condition still exists whenever any one of the registers IAR, AAR, BAR are being set with address information, AND circuits 34, 48 will set a corresponding one of the latches, 30, 32. When either latch 30, 32 is set the OR circuit 35 generates a WRAP ERROR signal on a line 36. However, if the wrap condition disappears, then the WRAP signal on line 26 will disappear, thereby causing an output from the inverter 28 so that one of the AND circuits 44, 49 will reset the corresponding latch 30, 32.

Figure 2:
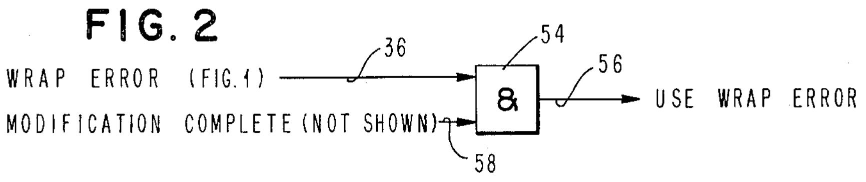
FIGURE 2 is a schematic block diagram illustrative of a gate for generating a USE WRAP ERROR signal in response to the circuit of FIGURE 1.

As described in detail in said copending application, it is possible to provisionally modify addresses in the embodiment disclosed therein (in which case the circuit of FIGURE 1 will generate a WRAP ERROR signal on line 36), and thereafter remodify the address, thereby removing the wrap condition (so that the circuit of FIGURE 1 would no longer generate a WRAP ERROR signal on line 36). It should be noted that the latches 30, 32 are only set when the address registers are set; however, since the address registers are in fact set (as discussed in detail in said copending application) the latches 30, 32 may be set as a result of a provisional modification. However, the WRAP ERROR signal on line 36 need not be sensed as such as indicated in FIGURE 2: FIGURE 2 is illustrative of the fact that an AND circuit 54 (or similar gating circuit) may be used to recognize the wrap error on line 36 by generating a USE WRAP ERROR on a line 56 only when there is some indication that modification is complete (such as a signal on line 58). The WRAP ERROR signal on line 36 would be applied to the OR circuit 702 shown in FIGURE 41, sheet 25, in said copending application, so as to generate the ANY ERROR signal on line 704. As discussed in said copending application, the ANY ERROR signal on line 704 is utilized to cause a stop signal (FIGURE 40) to block the oscillator (FIGURE 20) only at time A. Therefore, for use in the embodiment of said copending application, the MODIFICATION COMPLETE signal on line 58 (FIGURE 2 herein) would comprise time A; the USE WRAP ERROR signal on line 56 thereby being available to cause a stop condition only at the end of a cycle (time A) after all remodification has been completed.

Figure 3:
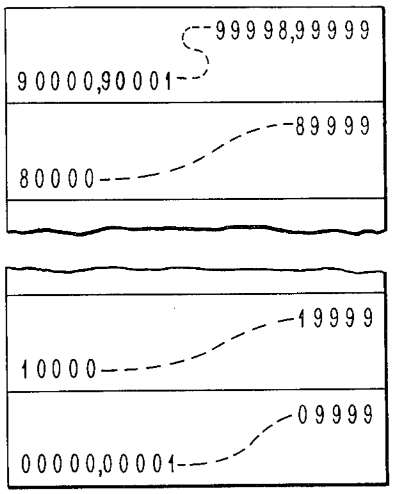
FIGURE 3 is a simplified illustrative chart of a memory system.
Figure 4:
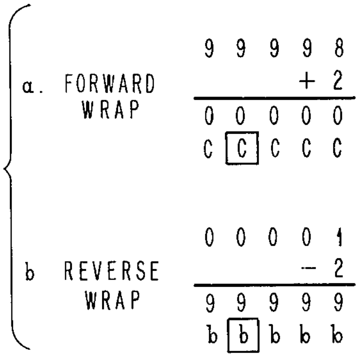
FIGURE 4 is a chart illustrating the arithmetic basis for FORWARD WRAP and REVERSE WRAP.

The operation of the REVERSE WRAP AND circuit 20 and the FORWARD WRAP AND circuit 22 (FIGURE 1) is illustrated with respect to FIGURES 3 and 4. In FIGURE 3, a brief diagram illustrates addresses in a memory, and it can be seen that an address at the high end of the memory such as 99999 if incremented by one would result in the lowest address of the memory 00000. Similarly, address 99998, when incremented by two, would become 00000. This is illustrated in FIGURE 4*a*, wherein incrementing the address 99998 by two will cause a zero with a carry (*c*) to propagate down through each of the positions. The carry in the thousands order has been encompassed within a square for emphasis. The AND circuit 22 in FIGURE 1 responds to the thousands order carry and to a decimal 9, which is equal to the 1-bit and the 8-bit in the 2-out-of-5 code used in the ADDRESS BUS (see FIGURE 5 in said copending application).

The REVERSE WRAP situation is illustrated in FIGURE 4*b*, wherein an address of 00001 if decremented by two would result in a nine and a borrow (*b*) propagated through each of the positions, to cause an address of 99999 with a zero in the highest (left most) position (which in this embodiment is the ten thousands order), and a borrow from that order by the thousands position (as emphasized by the square around the thousands BORROW). The AND circuit 20 (FIGURE 1) responds to a decimal zero, which comprises the 2-bit and the 8-bit in the 2-out-of-5 code, within the ten thousands order of the ADDRESS BUS and to a BORROW out of the thousands positions (as shown within the square in FIGURE 4). Thus, the AND circuits 20, 22 recognize wrap situations developed in a memory as illustrated briefly in FIGURE 3 in accordance with the arithmetic relationships shown in FIGURE 4.

Figure 6:
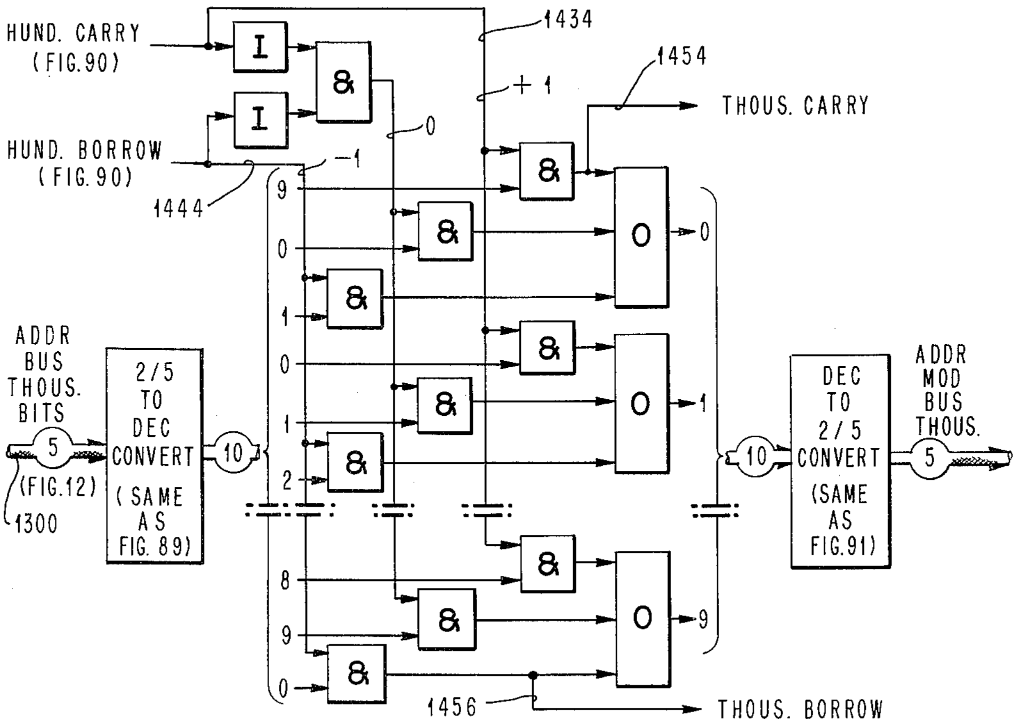
FIGURE 6 is a schematic block diagram of the THOUSANDS position of an ADDRESS MODIFIER used to generate CARRY and BORROW signals for the circuit of FIGURE 1.

The ADDRESS MODIFIER THOUSANDS circuit shown in FIGURE 6 is virtually identical with the address modifier tens circuit shown in FIGURE 92 and described in detail in Section 21*e* of said copending application. It suffices here that whenever a combination of input signals on the address bus together with the carry and borrow signals from the hundreds order result in a change from a 9 to a 0, or vice versa, in the ADDRESS MOD BUS THOUSANDS output, a THOUSANDS CARRY or a THOUSANDS BORROW signal will appear on one of the lines 42, 40.

Figure 7:
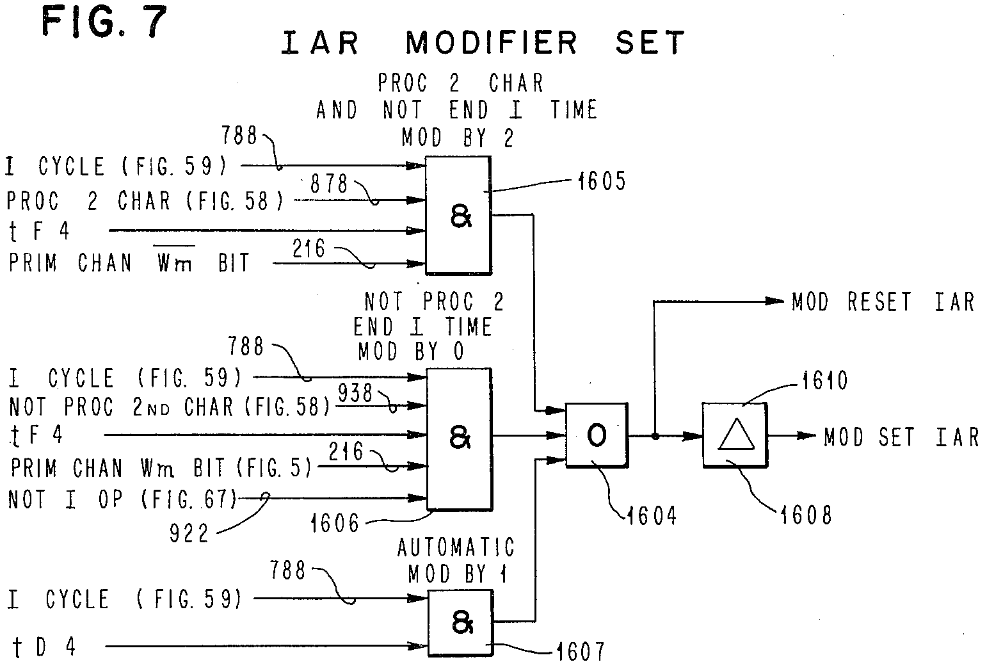
FIGURE 7 is a schematic block diagram of a IAR MODIFIER SET circuit.

In FIGURE 7 is shown the IAR MODIFIER SET signal generating circuit which produces a MOD SET IAR signal on line 1610 after a delay (1608) in response to an OR circuit 1604 which is operated by any one of three AND circuits 1605–1607. The AND circuit 1605 is operative at time F4 (which is second character processing time in the embodiment of said copending application) provided that a second character can be processed (878) during an I CYCLE (788), and provided that there is no terminating WORD MARK bit (216). The AND circuit 1606 is similarly operative at time F4 of each I CYCLE (788) when there is a terminating WORD MARK bit (216) and a NOT PROCESS 2ND CHARACTER signal on line 838. The WORD MARK bit (216) is recognized as a terminating condition due to the presence of the NOT I OP signal on line 922. The AND circuit 1607 causes the MOD SET IAR signal at time D4 of each I CYCLE (this is first character processing time in said copending application).

The AND circuit 1605 therefore causes a MOD SET IAR to occur when the IAR is to be incremented an additional amount as a result of processing two characters, and AND circuit 1606 is operative to set the IAR when the IAR address is to be decremented as a result of sensing the end of an instruction. The AND circuit 1607 causes the normal automatic modification of the IAR during the first part of each I cycle.

The details of this circuit, and the environment within which it is to operate are clearly set forth in said copending application; for the purposes of this description, it suffices to recognize that setting of the IAR can occur automatically at time D4, and may occur at time F4 in order to correct the setting of the IAR by a positive or negative amount.

Figure 8:
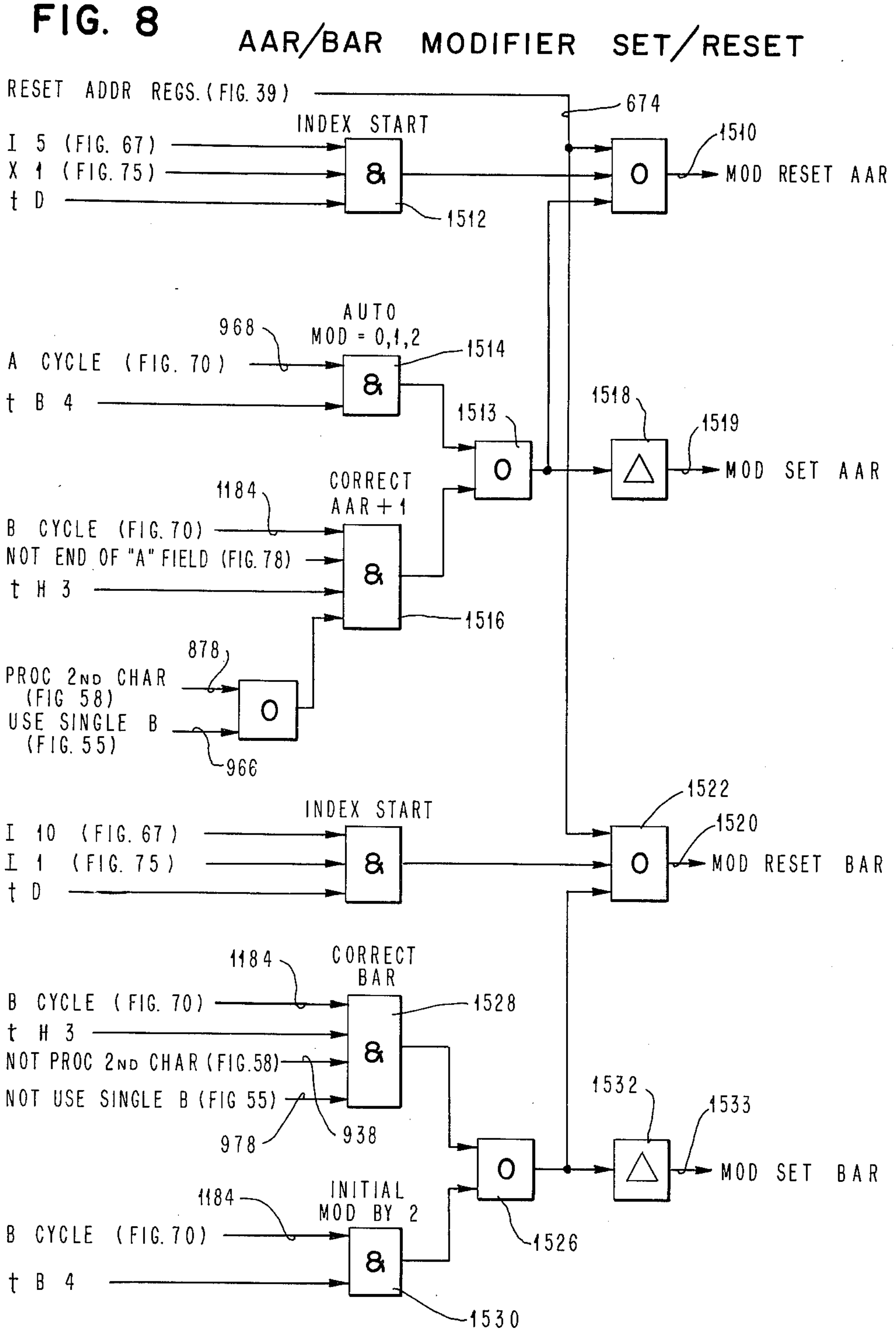
FIGURE 8 is a schematic block diagram of a AAR/BAR MODIFIER SET/RESET circuit.

In FIGURE 8, signals used for setting the AAR and the BAR are generated. The MOD SET BAR signal on line 1533 is generated after a delay (1532) by an OR circuit 1526 in repsonse to either one of two AND circuits 1528, 1530. The AND circuit 1530 operates during the first half (time B4) of each B cycle (1184) to cause the BAR to be incremented by two, in said copending application. This is a case wherein the incrementing by two might cause a WRAP ERROR signal to appear on line 36 (FIGURE 1) herein. However, AND circuit 1528 would become operative provided there is a NOT PROCESS 2ND CHARACTER signal on a line 938 in a situation other than a USE SINGLE B condition (978), at time H3, so as to cause setting of the BAR as a result of a remodification of the B address due to the fact that two characters will not be processed after all. Thus the AND circuit 1530 might cause a first MOD SET BAR signal to set the latch 32 in FIGURE 1, and the AND circuit 1528 might shortly thereafter generate a MOD SET BAR signal to effect resetting of the latch 32 as a result of an adjustment in the B address which avoids the wrap around condition.

The MOD SET AAR signal on line 1519 is generated after delay (1518) by an OR circuit 1513 which responds to either of two AND circuits 1514, 1516. The AND circuit 1514 is operative at time B4 of each A cycle (968) to provide setting of the AAR in response to the automatic initial (or preliminary) modification of the AAR. The AND circuit 1516 is operative during a B cycle in either a process second character situation (878) or a USE SINGLE B situation (966) to provide for incrementing the AAR by an additional unit whenever the end of the A field has not been sensed (428).

The details of the circuit of FIGURE 8 and an explanation of the reasons therefor may be found in Section 23 of said copending application.

Figure 5:
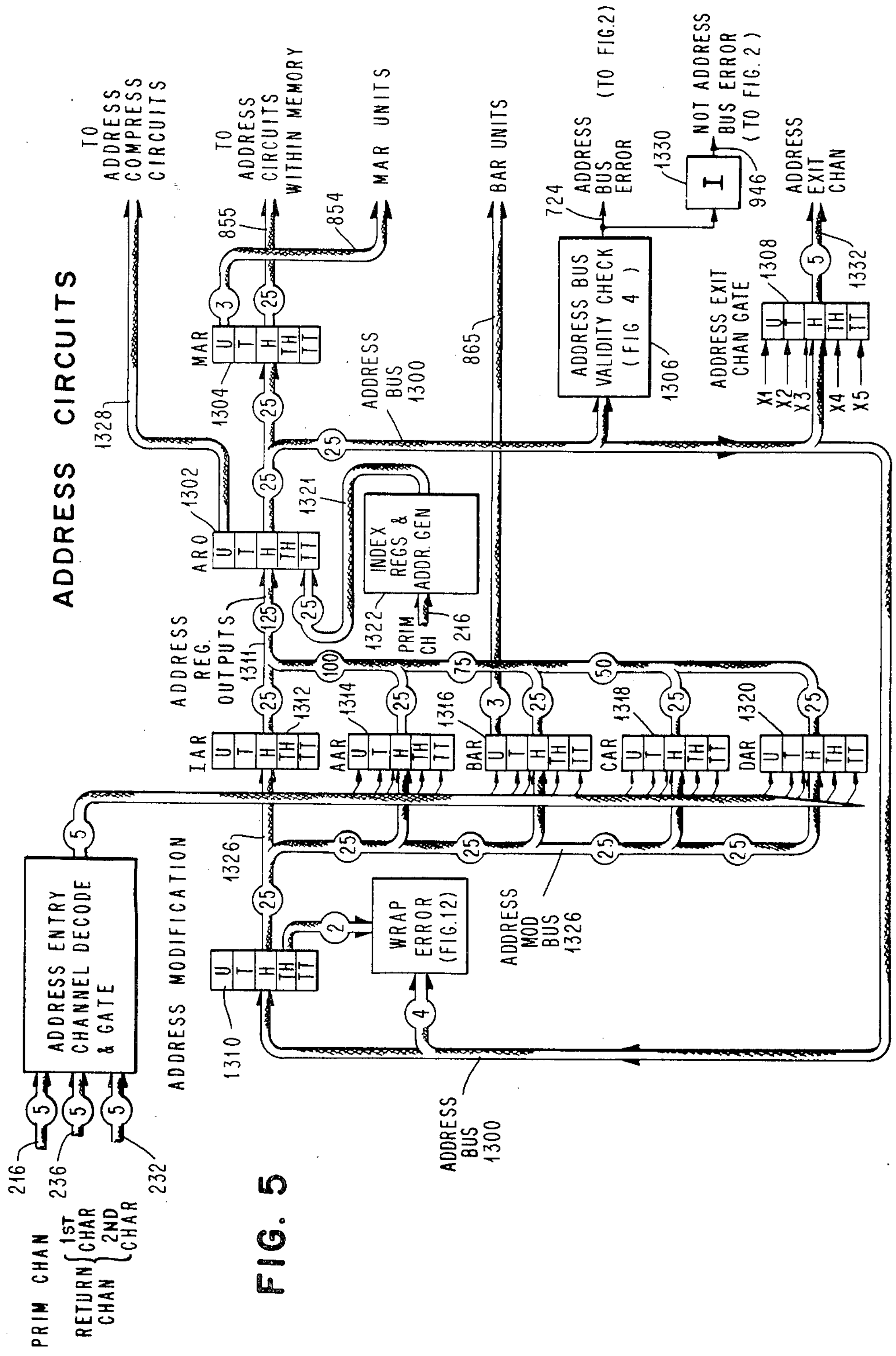
FIGURE 5 is a schematic block diagram of ADDRESS CIRCUITS within which the present embodiment may be utilized.

An overall block diagram of address circuits within which the wrap error circuit of the present invention may be embodied is shown in FIGURE 5. The manner in which the address modification circuits and address bus are applied to the wrap error circuit of FIGURE 1 is shown in the upper left hand side of FIGURE 5.

From the foregoing, it should be apparent that there has been provided a relatively simple and straightforward method of sensing only those wrap errors which cause at least a provisionally operative address to be generated, and which permits removing a wrap error condition prior to the time that errors are sensed, whenever the wrap around condition has been removed by remodifying the address so as to generate a complete address.

Although the device has been described in terms of wrapping-around from 99999 to 00000, and vice versa, in a machine having 40,000 storage locations, numbered from 00000 to 39999, a modification from 39999 to 40000 would be a wrap error. This could be sensed by combining a 3 in the highest ordered position with a carry from the next highest ordered position, as disclosed herein with respect to the 9 and the carry. Similarly, any other modification which attempts to express the address of a location which does not exist in the machine, or which otherwise generates an unwanted address, could be sensed, and is included in the definition of "wrap condition" herein. The general facts set forth in this paragraph are known in the art, and do not comprise a part of the invention herein.

It should be noted that the setting of a latch in response to a provisional address modification (which may in fact be a final modification), together with the resetting of the latch whenever a re-modification of the same address results in removal of the wrap condition, is the essential feature of this invention. A further feature is the fact that the condition of said latch need not be sensed until a complete modification has been achieved. In this embodiment, a complete modification is recognized by time A; in other environments of the invention, any other "modification complete" signal may be used.

While the invention has been particularly shown and described with reference to a preferred embodiment thereof, it will be understood by those skilled in the art that various changes in form and details may be made therein without departing from the spirit and scope of the invention.

What is claimed is:

1. In a data processing system of the type having addressing circuits for generating manifestations representative of locations within a memory apparatus, said addressing circuits including address modification means capable of incrementing and decrementing addresses in an arithmetic fashion, a wrap error circuit, comprising:
means responsive to said addressing circuits for generating a wrap signal in response to said modification means generating an unwanted address;
and means responsive to said wrap signal and to said addressing means for generating an error signal in response to the generation of a complete address concurrently with the presence of said wrap signal.

2. The device described in claim 1 further comprising:
means for generating a gating signal indicative of the completion of address modification;
and means responsive to said gating signal and to said provisional wrap error signal for generating an error signal.

3. In a data processing system of the type having addressing circuits for generating manifestations representative of locations within a memory apparatus, said addressing circuits including address modification means capable of incrementing and decrementing addresses in an arithmetic fashion, and also including address registers into which modified addresses may be set; a wrap error circuit comprising:
wrap condition means responsive to said addressing circuits for generating a wrap signal in response to said modification means generating an unwanted address;
wrap means settable into a set state and into a reset state, alternatively, said wrap means, when set, generating a provisional wrap error signal;
means responsive to said wrap signal and to said addressing means for setting said wrap means in response to a modified address being set into an address register concurrently with the presence of said wrap signal;
and means responsive to said addressing means to reset said wrap means in response to a modified address being set into an address register concurrently with the absence of said wrap signal.

4. The device described in claim 3 further comprising:
means for generating a gating signal indicative of the completion of address modification;

and means responsive to said gating signal and to said provisional wrap error signal for generating an error signal.

5. The device described in claim 4 additionally comprising:

first means responsive to the arithmetic conditions of said addressing means for generating a carry signal;

second means responsive to said addressing means for designating a high order address at the input of the modification circuitry of said addressing means;

third means responsive to said first and second means for generating a forward wrap signal in response to said modification means generating a low address as a result of modifying a high address;

fourth means responsive to the arithmetic conditions of said addressing means to generate a borrow signal;

fifth means responsive to said addressing means for designating a low order address at the input to the modification circuitry of said addressing means;

sixth means responsive to said fourth and fifth means for generating a reverse wrap signal in response to said modification means generating a high address as a result of modifying a low address;

and said wrap condition means being responsive to said forward wrap signal and said reverse wrap signal to generate said wrap signal.

No references cited.

ROBERT C. BAILEY, *Primary Examiner.*

M. LISS, *Assistant Examiner.*